Figure 1:
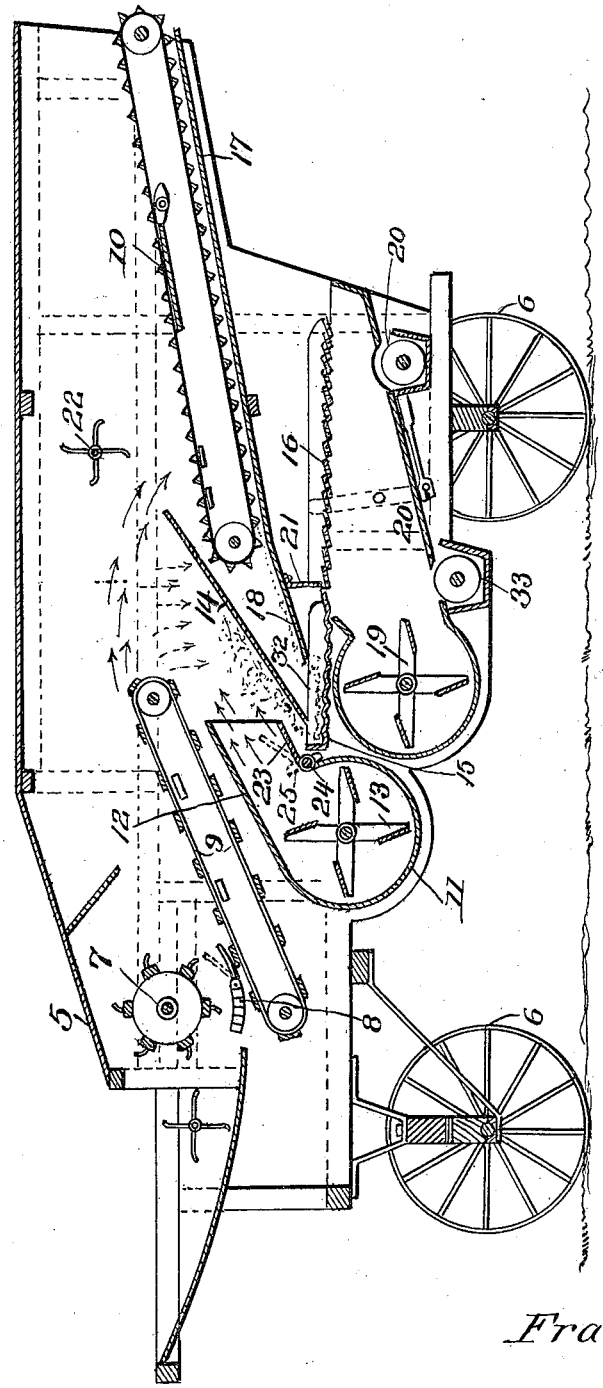

F. AYLER.
GRAIN SEPARATOR.
APPLICATION FILED JAN. 19, 1910.

975,598.

Patented Nov. 15, 1910.
2 SHEETS—SHEET 1.

Witnesses

Inventor
Frank Ayler
By ........., Attorneys

F. AYLER.
GRAIN SEPARATOR.
APPLICATION FILED JAN. 19, 1910.
975,598.
Patented Nov. 15, 1910.
2 SHEETS—SHEET 2.
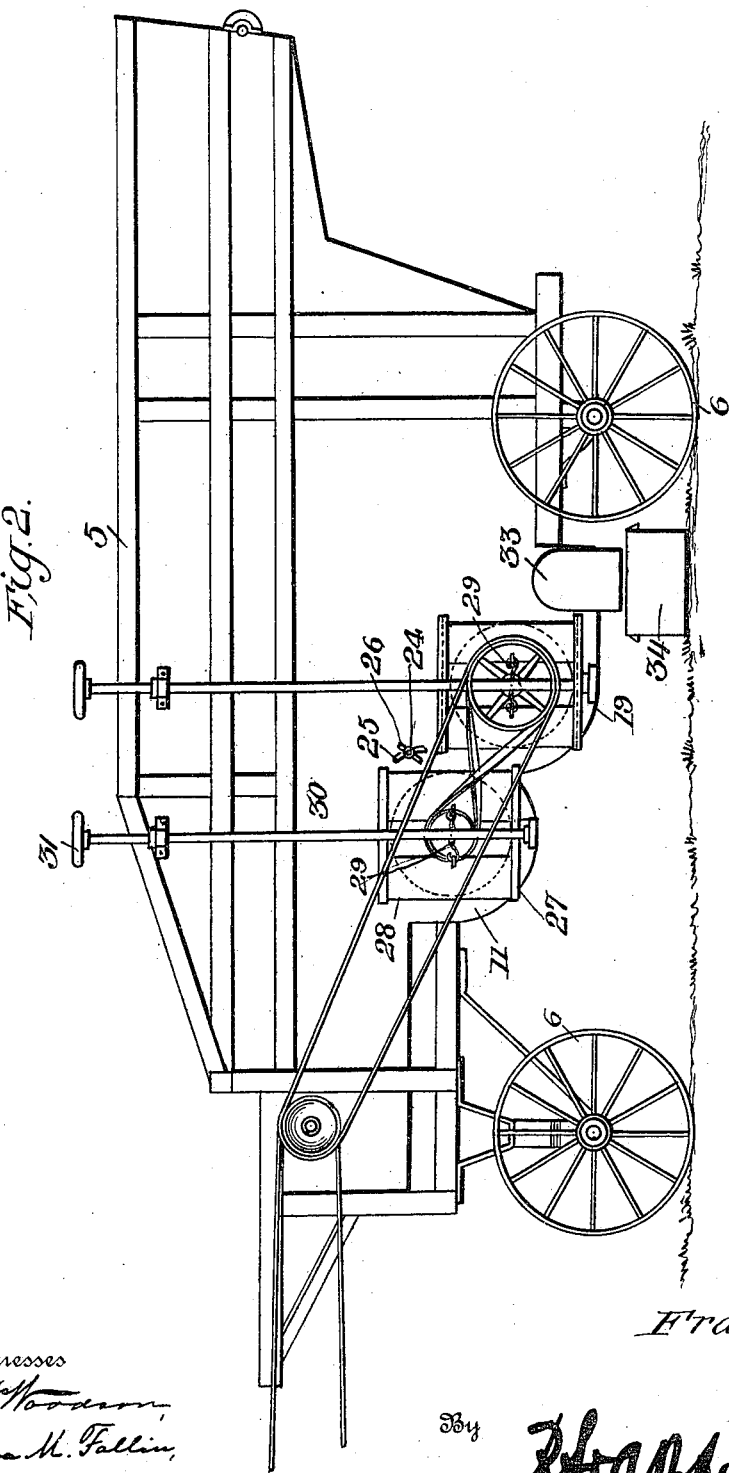

UNITED STATES PATENT OFFICE.

FRANK AYLER, OF WINONA, WASHINGTON.

GRAIN-SEPARATOR.

975,598.   Specification of Letters Patent.   Patented Nov. 15, 1910.

Application filed January 19, 1910. Serial No. 538,939.

*To all whom it may concern:*

Be it known that I, FRANK AYLER, citizen of the United States, residing at Winona, in the county of Whitman and State of Washington, have invented certain new and useful Improvements in Grain-Separators, of which the following is a specification.

This invention relates to threshing machines and has for its object the provision of a strong, durable and thoroughly efficient machine of this character, in which the separation of the grain from the straw is effected by subjecting the straw to the action of a blast of air during its passage through the machine.

A further object is to provide means for directing the grain dislodged from the straw into a suitable pan or receptacle designed to receive the same.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

For a full understanding of the invention and the means for effecting the result, reference is to be had to the following description and accompanying drawings, in which:

Figure 1 is a longitudinal sectional view of a threshing machine constructed in accordance with my invention; Fig. 2 is a side elevation of the same.

Corresponding and like parts are referred to in the following description and indicated in all the views of the drawings by the same reference characters.

The threshing machine or separator forming the subject matter of the present invention comprises a supporting frame or casing 5 mounted upon ground wheels 6 and provided with the usual threshing cylinder 7 and concave 8.

Mounted for rotation within the casing 5 are front and rear feeding devices 9 and 10, preferably in the form of endless conveyers, as shown, said conveyers being disposed in different inclined planes and having their adjacent ends spaced apart to form an intermediate gap over which the straw travels in its passage from one conveyer to the other.

Arranged beneath the front feeding device or conveyer 9 is a fan casing 11 having a rearwardly and upwardly inclined spout 12 through which a blast of air from the fan 13 is directed on the straw as the latter travels from one conveyer to the other, thus to dislodge any grain adhering to the straw after being subjected to the action of the threshing cylinder and concave.

Interposed between the conveyers 9 and 10, is an inclined plate 14, which serves to direct the loose grain onto a suitable pan or receptacle 15 arranged beneath said inclined plate and in advance of the fan 13. The upper surface of the pan 15 is preferably corrugated so as to assist in feeding the grain deposited thereon to a riddle 16, the latter being mounted for oscillation beneath the rear conveyer 10 in the usual manner. Arranged beneath the rear conveyer 10, is an inclined floor 17 having a downwardly inclined extension 18 which serves to direct the grain passing through the slats of the conveyer 10 downwardly onto the pan 15. A fan 19, similar in construction to the fan 13 is preferably arranged beneath the pan 15 for the purpose of relieving the grain from chaff and the like before its delivery into the hopper 20. Depending from the inclined extension 18 of the floor 17 is a flexible guard or shield 21 which prevents the air from the fan 19 from dislodging the grain deposited on the pan 15.

A suitable beater 22 is preferably mounted for rotation in the upper portion of the casing 5 at the end of the inclined plate 14 to assist in agitating the straw and thus permit the grain to be dislodged therefrom by the action of the fan 13. The spout 12 is provided with a movable wall 23, the pivot pin 24 of which is extended through segmental slots 25 formed in the opposite side walls of the casing 5 for engagement with wing nuts 26 so that after the plate or deflector 23 has been adjusted, the same may be securely locked in position by rotating the wing nuts 26. The purpose of the plate or deflector 23 is to direct a blast of air from the fan 13, either in the direction of the upper end of the plate 14 or toward the upper end of the conveyer 9.

Slidably mounted in suitable guides 27 on the supporting frame, are shutters 28, the latter being connected through the medium of links 29 with an actuating rod 30 so that by rotating the wheel or finger piece 31 of the rod, the shutters 28 may be adjusted to regulate the admission of air to the fan 13. If desired, shutters similar in construction to the shutters 28, may be disposed at the fan 19. Attention is here called to the fact that the upper end of the inclined plate 14 is extended above the lower end of the conveyer 10 so as to form in effect a support for the straw during its passage from one conveyer to the other and thus hold the straw in suspension at this point and allow the loose grain to be dislodged by the action of the blast of air. It will also be noted that the pan 15 is provided with a flange 32 which prevents accidental displacement of the grain on said pan. Thus it will be seen that the straw after leaving the threshing cylinder is caused to travel through the machine by the conveyers 9 and 10. As the straw passes from one conveyer to the other, the blast of air from the fan will dislodge the grain adhering to the straw, which grain will be directed to the pan 15 by the inclined plate 14. When the straw reaches the conveyer 10, any loose grain not separated therefrom by the threshing cylinder and air blast will pass between the slats of the conveyer 10 and be directed onto the pan 15 by the inclined extension 18 of the floor 17, the grain deposited on the pan 15 being fed to the riddle 16 and thence through augers or conveyers 33 into a suitable receptacle 34 designed to receive the same. It will of course be understood that the spout 12 of the fan may be extended from either the front or rear wall thereof, and that the beater 22 may be positioned at any desired point within the casing without departing from the spirit of the invention. It is preferred however, to mount the beater 22 above the top of the inclined plate 14 so as to agitate the straw at this point and thus allow any grain not dislodged by the action of the blast of air to pass downwardly through the slats of the conveyer 10 onto the pan 15 in the manner before stated. It will also be understood that the device may be position on or at any desired point with reference to the mechanism of different styles or types of grain separators and threshing machines, and that the grain and straw may be carried either directly or indirectly from the cylinder to the air blast with any style of conveyer or feeding device, without departing from the spirit of the invention.

Having thus described the invention, what is claimed as new is:

1. A threshing machine including spaced conveyers, a fan for directing a blast of air on the straw as the latter travels from one conveyer to the other, a receiving pan, an inclined plate having its upper end extended above the lower end of the rear conveyer, and its lower end disposed above the receiving pan, a floor arranged beneath the rear conveyer and provided with an extension projecting in the direction of said receiving pan, and a flexible guard depending from said inclined extension and disposed at the rear end of the receiving pan.

2. A threshing machine including spaced conveyers disposed in different inclined planes, a fan casing having a spout extending upwardly between said conveyers and provided with a movable wall, a fan mounted for rotation in the casing for directing a blast of air on the straw as the latter travels from one conveyer to the other, a receiving pan, an inclined plate having its lower end disposed above the receiving pan and its upper end extended above the inner end of the rear conveyer to form a partial barrier for the straw, a beater mounted for rotation above the upper end of the inclined plate, a floor disposed beneath the rear conveyer and provided with a downwardly inclined extension, and a flexible guard depending from the extension of the floor at the rear of the receiving pan.

In testimony whereof I affix my signature in presence of two witnesses.

FRANK AYLER. [L. S.]

Witnesses:
  E. V. HUGHES,
  GUY HUGHES.